United States Patent

Imamura et al.

(10) Patent No.: US 10,471,952 B2
(45) Date of Patent: Nov. 12, 2019

(54) METHOD OF CONTROLLING DRIVING FORCE

(71) Applicant: Mazda Motor Corporation, Aki-gun, Hiroshima (JP)

(72) Inventors: Yasumasa Imamura, Hiroshima (JP); Yasushi Yagi, Hiroshima (JP); Daisuke Kofu, Hiroshima (JP); Akihiro Tatara, Aki-gun (JP); Naoki Nobutani, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 1 day.

(21) Appl. No.: 16/006,690

(22) Filed: Jun. 12, 2018

(65) Prior Publication Data

US 2018/0362021 A1 Dec. 20, 2018

(30) Foreign Application Priority Data

Jun. 14, 2017 (JP) ................................. 2017-116504

(51) Int. Cl.
*B60W 30/02* (2012.01)

(52) U.S. Cl.
CPC .......... *B60W 30/02* (2013.01); *B60W 2520/26* (2013.01); *B60W 2520/28* (2013.01); *B60W 2550/147* (2013.01); *B60W 2720/26* (2013.01)

(58) Field of Classification Search
CPC ............. B60W 30/02; B60W 2520/26; B60W 2520/28; B60W 2550/147; B60W 2550/148; B60W 2720/26
See application file for complete search history.

(56) References Cited

U.S. PATENT DOCUMENTS

| 9,290,176 | B2 | 3/2016 | Yamashita | |
|---|---|---|---|---|
| 2005/0085988 | A1* | 4/2005 | Ushiroda | B60K 17/346 701/80 |
| 2008/0183353 | A1* | 7/2008 | Post | B60G 17/0165 701/42 |
| 2013/0030664 | A1* | 1/2013 | Yagi | B60K 17/35 701/69 |

FOREIGN PATENT DOCUMENTS

| JP | 5793877 B2 | 10/2015 |
|---|---|---|
| JP | 2018083548 A | 5/2018 |

* cited by examiner

*Primary Examiner* — Edwin A Young
(74) *Attorney, Agent, or Firm* — Alleman Hall Creasman & Tuttle LLP

(57) ABSTRACT

A method of controlling a driving force of a four-wheel drive vehicle includes causing a control unit to acquire a vehicle speed, a lateral acceleration, a driving force of a wheel, a road surface friction coefficient, and a ground contact load of the wheel when the vehicle is traveling, determine whether a road surface is rough based on the acquired road surface condition, correct, when the road surface is determined to be rough, the load of the wheel, by applying thereto a load change rate set according to the roughness, predict a slip occurrence of the wheel by comparing a product of the corrected load and the road surface friction coefficient to a total force of the driving force and a lateral force caused by a lateral acceleration in cornering, and reduce, when the slip occurrence is predicted, the driving force so as to prevent the slip occurrence.

6 Claims, 6 Drawing Sheets

|   | SMOOTH ROAD SURFACE | ROUGH ROAD SURFACE |
|---|---|---|
| $\gamma$ | 0.9 | 0.85 |

FIG. 3

METHOD OF CONTROLLING DRIVING FORCE

TECHNICAL FIELD

The present disclosure relates to a method of controlling a driving force of a four-wheel-drive vehicle, and particularly relates to a method of controlling a driving force to prevent a slip of drive wheels according to a road surface condition.

BACKGROUND OF THE DISCLOSURE

Conventionally, four-wheel-drive (4WD) vehicles are put to practical use, which travel by driving front wheels (main drive wheels) and are provided with a rear-wheel-drive system having a coupling part capable of distributing a driving force to rear wheels (part-time drive wheels) when a slip occurrence of the front wheels is detected during the travel. This allows the structure of the rear-wheel-drive system to be lighter in weight compared to a vehicle which always travels in a 4WD mode, and prevents, by normally traveling in a front-wheel-drive mode, a loss of the driving force in the rear-wheel-drive system, which are advantageous in achieving improvements in both traveling performance on a road surface where the slip easily occurs and fuel efficiency.

For example, JP5793877B discloses a control device for such a 4WD vehicle which distributes a driving force to rear wheels via a coupling part and reduces a loss of the driving force when a front-wheel slip amount detected based on a vehicle speed and a front wheel speed increases, which is when the loss of the driving force increases.

Meanwhile, when the vehicle turns, a ground contact load of an inner wheel of drive wheels decreases and a ground contact load of an outer wheel of the drive wheels increases due to rolling of the vehicle. It was found, from measuring ground contact load of the wheels by causing the vehicle to actually travel on a test road applying a general traveling pattern, that the ground contact loads of each wheel changes by about 10%-50% when turning. Since a reduction in the ground contact load lowers a force of friction with a road surface, a total force of the driving force of the inner wheel and a lateral force acting thereon easily exceeds the frictional force when turning, which facilitates the occurrence of slip. The present applicants have already proposed an art for predicting an occurrence of such a slip and preventing it (JP2016-228188).

On the other hand, it was found from the measurement of the ground contact loads that, even on a smooth pavement surface, each ground contact load changes by about 10% at most due to an undulation of the road surface, etc., and on a rough pavement surface with uneven parts because of cracks, etc., the ground contact load changes by about 15% at most due to the unevenness of the road surface in addition to the undulation thereof. Therefore, on the rough road surface, since the ground contact load decreases more than on the smooth road surface, the possibility of slip occurrence increases. Particularly when the vehicle turns, the ground contact load of the inner wheel decreases due to the rolling as described above, and therefore, the total force of the driving force and the lateral force exceeds the frictional force more easily and the slip easily occurs.

However, no art is known for controlling a driving force corresponding to such a rough road surface, and the slip caused by the rough road surface cannot be prevented. If the driving force is to be distributed to part-time drive wheels sufficiently before the total force of the driving force and the lateral force exceeds the frictional force in order to prevent the slip caused by the rough road surface, a frequency of driving the part-time drive wheels increases and fuel efficiency may degrade.

SUMMARY OF THE DISCLOSURE

The purpose of the present disclosure is to provide a method of controlling a driving force of drive wheels so as to prevent a slip occurrence according to a roughness of a road surface.

According to one aspect of the present disclosure, a method of controlling a driving force of a four-wheel drive vehicle is provided, which includes causing a control unit including a processor to acquire, as information on a road surface condition, a vehicle speed, a lateral acceleration, a driving force of a wheel, a road surface friction coefficient, and a ground contact load of the wheel when the vehicle is traveling, the ground contact load calculated based on a ground contact load of the wheel when the vehicle is stopped and the lateral acceleration, determine whether a road surface is rough based on the acquired road surface condition, correct, when the road surface is determined to be rough, the ground contact load of the wheel when the vehicle is traveling, by applying thereto a load change rate set according to the roughness of the road surface, predict an occurrence of a slip of the wheel by comparing a product of the corrected ground contact load and the road surface friction coefficient to a total force of the driving force of the wheel and a lateral force caused by a lateral acceleration in cornering, and reduce, when the slip is predicted to occur, the driving force of the wheel so as to prevent the slip occurrence.

With this configuration, the correction in which the determined road surface roughness is reflected on the ground contact load of the wheel is performed. Further, the slip occurrence prediction of the wheel is performed based on the corrected ground contact load, the road surface friction coefficient, the lateral force, and the driving force. If the slip is predicted to occur, the driving force is controlled to prevent the slip occurrence. Thus, the driving force control is executed according to the road surface roughness, which effectively prevents the slip occurrence.

In the method described above, when a slip of main drive wheels to which a driving force of the engine is transmitted without using a coupling is predicted to occur in the slip occurrence prediction, in the driving force reduction, driving forces of the main drive wheels may be reduced by engaging the coupling to distribute the driving force of the engine to part-time drive wheels to which the driving force of the engine is transmitted through the coupling.

In the method described above, a ground contact load of an inner wheel of the main drive wheels when the vehicle turns may be corrected in the ground contact load correction, and when a slip of the inner wheel is predicted to occur in the slip occurrence prediction, in the driving force reduction, a driving force of the inner wheel may be reduced by distributing the driving force of the engine to the part-time drive wheels through engaging the coupling.

With this configuration, since the reduction of the ground contact load due to the road surface roughness is reflected on the inner wheel when the vehicle turns, the slip due to the road surface roughness experienced by the inner wheel which easily slips is predicted so that the slip is effectively prevented.

Further, when the slip of the main drive wheels is predicted to occur, since a part of the driving force for the main drive wheels is distributed to the part-time drive wheels, the slip occurrence of the main drive wheels is effectively prevented while keeping the driving force of the vehicle.

According to another aspect of the present disclosure, a driving force control device for a four-wheel drive vehicle is provided, which includes a wheel speed sensor configured to acquire a speed of a wheel, a lateral acceleration sensor configured to acquire a lateral acceleration of the vehicle, a road surface condition detector configured to acquire information on a road surface condition, and a control unit including a processor configured to acquire a driving force of an engine after passing through a transmission, a road surface friction coefficient calculated based on the speed of the wheel and the driving force, and a ground contact load of the wheel when the vehicle is traveling, the ground contact load calculated based on a ground contact load of the wheel when the vehicle is stopped and the lateral acceleration. The control unit corrects the ground contact load of the wheel when the vehicle is traveling by applying thereto a load change rate set according to a roughness of a road surface estimated based on the information on the road surface condition. When a friction circle defined by a product of the corrected ground contact load and the road surface friction coefficient is compared to a total force of the driving force of the wheel and a lateral force caused by a lateral acceleration in cornering to find that the total force is close to the friction circle, the driving force of the wheel is reduced to prevent a slip from occurring.

In the driving force control device, when the total force is close to the friction circle for main drive wheels to which the driving force of the engine is transmitted without using a coupling, the control unit may distribute the driving force to part-time drive wheels by engaging the coupling.

In the driving force control device, when the total force is close to the friction circle for an inner wheel of the main drive wheels in cornering, the control unit may distribute the driving force to the part-time drive wheels by engaging the coupling.

BRIEF DESCRIPTION OF THE DRAWINGS

FIG. 3 is a table illustrating load change rates γ according to a roughness of a road surface.

DETAILED DESCRIPTION OF THE DISCLOSURE

One embodiment for carrying out the present disclosure is described.

Embodiment

Figure 1:
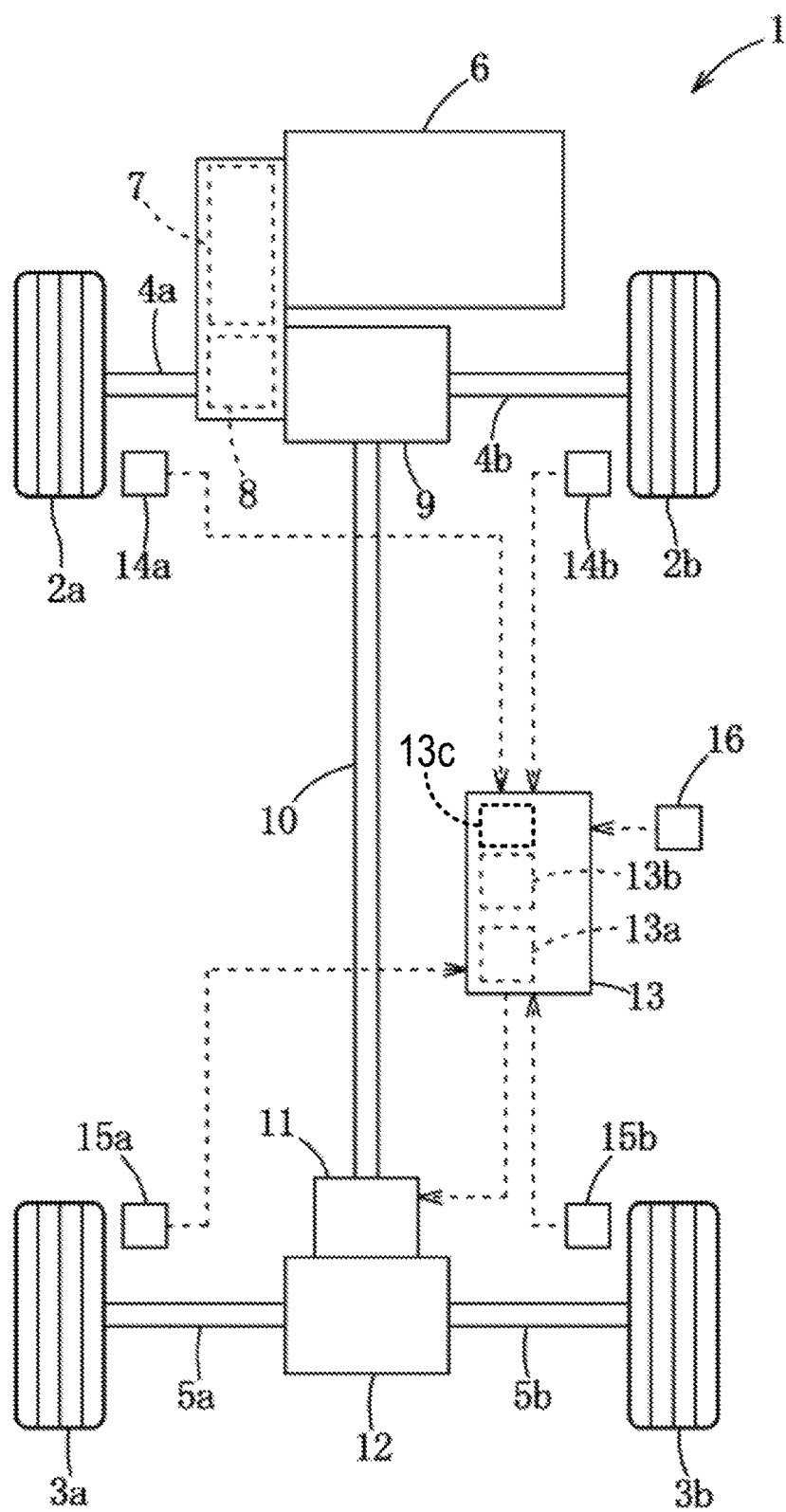
FIG. 1 is a schematic configuration view of a drive system of a 4WD vehicle based on a front-wheel drive mode according to one embodiment.

A vehicle 1 is a 4WD vehicle based on front-wheel drive. The vehicle 1 normally travels by driving front wheels (main drive wheels) and, when a slip of the front wheels is predicted to occur when traveling, distributes also to rear wheels (part-time drive wheels) a driving force so that the vehicle travels in the 4WD mode. As illustrated FIG. 1, the vehicle 1 includes right and left front wheels 2a and 2b, right and left rear wheels 3a and 3b, front wheel axles 4a and 4b, rear wheel axles 5a and 5b, an engine 6, a transmission 7, a front-wheel differential gear device 8, a transfer 9 which extracts a driving force to be transmitted to the rear wheels 3a and 3b, a driving force transmission shaft 10, a coupling 11, a rear-wheel differential gear device 12, a control unit 13, etc.

The driving force of the engine 6 is transmitted to the front-wheel differential gear device 8 after being shifted in the transmission 7, and then the driving force is transmitted from the front wheel axles 4a and 4b connected to the front-wheel differential gear device 8 to the right and left front wheels 2a and 2b. During the four-wheel drive, a part of the driving force of the engine 6 is transmitted to the driving force transmission shaft 10 via the transfer 9 and distributed to the rear wheels 3a and 3b by the coupling 11. An input shaft of the coupling 11 is connected to a rear end of the driving force transmission shaft 10 and an output shaft of the coupling 11 is connected to a drive pinion of the rear-wheel differential gear device 12. The coupling 11 controls a driving force to be distributed to the rear-wheel differential gear device 12 via an internal electromagnetic clutch mechanism. In this embodiment, the coupling 11 is an electronically controlled coupling.

Detection signals from various sensors, such as wheel speed sensors 14a and 14b of the left and right front wheels, wheel speed sensors 15a and 15b of the left and right rear wheels, and a lateral acceleration sensor 16 are inputted to the control unit 13. Further, the control unit 13 exchanges various signals with the engine 6, the transmission 7, a steering mechanism, a shift lever, an accelerator pedal, a brake pedal (not illustrated), etc., and controls the engine 6 and the transmission 7 based on these signals.

Figure 2:
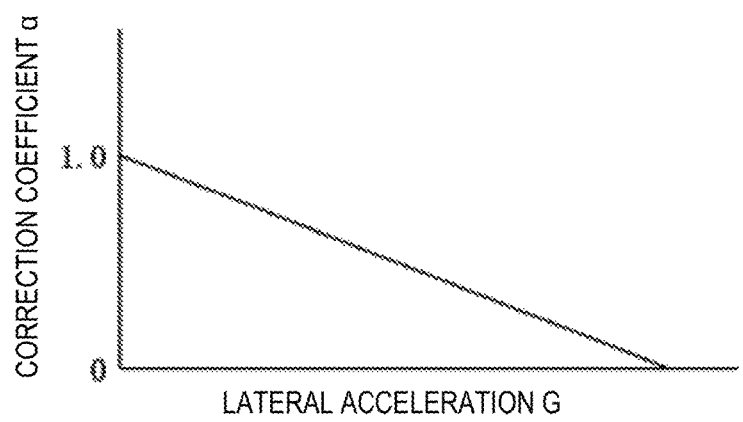
FIG. 2 is a chart illustrating a relationship between a lateral acceleration G and a correction coefficient α.

The control unit 13 includes a traction controlling module 13a, a road surface condition determining module 13b, and a processor 13c configured to execute each module to achieve its respective function. Each module is software stored in memory of the control unit 13. The traction controlling module 13a executes a control for preventing idling of the drive wheels based on the detection signals of the various sensors (the wheel speed sensor 14a, etc.), a determination result of the road surface condition determining module 13b, etc. The road surface condition determining module 13b acquires information of the road surface condition and determines a roughness of a road surface (determines whether the road surface is rough). Here, the roughness of the road surface is determined based on information on the road surface condition acquired from a road surface condition detector, such as a camera or a radar device (not illustrated) installed in the vehicle 1 to detect an obstacle, etc. in a forward area of the vehicle 1, or the wheel speed sensor 14a for controlling, for example, an anti-lock braking system and a traction control system. Further, the control unit 13 stores a correction coefficient α corresponding to a lateral acceleration G illustrated in FIG. 2, a load change rate α corresponding to the road surface roughness illustrated in FIG. 3, and a control program for a driving force control illustrated in FIG. 4.

Figure 4:
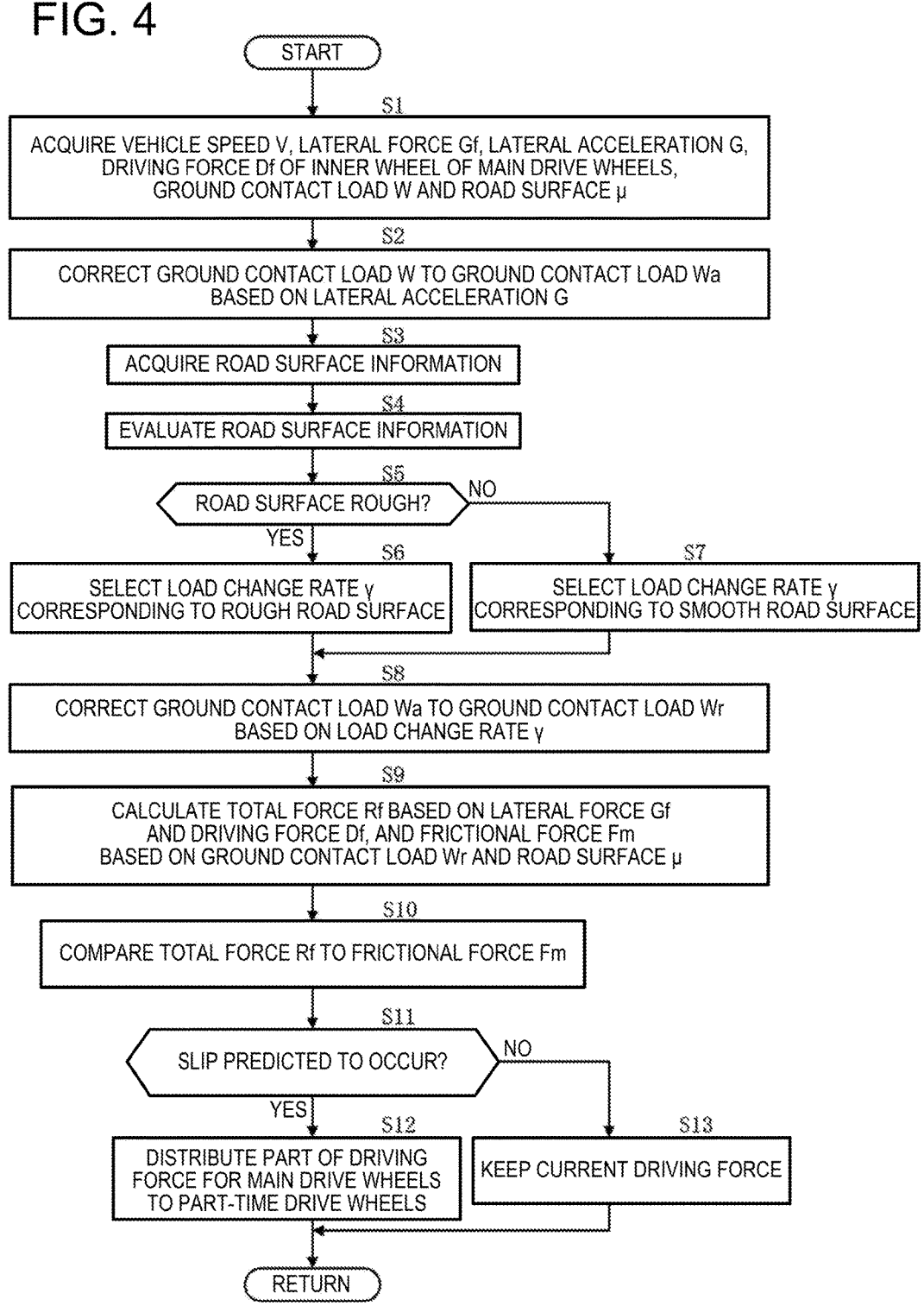
FIG. 4 is a flowchart illustrating a method of controlling a driving force of the present disclosure.

Next, a driving force control which the control unit 13 repeatedly executes according to the road surface roughness while the vehicle 1 travels will be described with reference to the flowchart of FIG. 4. Si (i=1, 2, . . . ) in the figure indicates a step.

First, a vehicle speed V, a lateral force Gf, the lateral acceleration G, and a driving force Df of an inner wheel of the main drive wheels when traveling, a ground contact load W when the vehicle is stopped, a road surface µ (road surface friction coefficient), etc. are acquired at S1. The inner and outer wheels may be distinguished from each other based on a steering angle of a steering mechanism, or angular speeds of the wheels acquired from the wheel speed sensors 14a and 14b, etc. Although either the left or right wheel may be the inner wheel when traveling straight, the inner wheel may be determined in advance, for example, to the left wheel.

Next, at S2, the ground contact load W is corrected to a ground contact load Wa of the inner wheel when the vehicle turns. This correction is performed by an arithmetic expression of Wa=W×α based on the relationship between the lateral acceleration G and the correction coefficient α in FIG. 2. The ground contact load W when the vehicle is stopped is stored in advance in the control unit 13 depending on the specification of the vehicle 1. Since the ground contact load Wa of the inner wheel when the vehicle turns decreases as the lateral acceleration G increases, the correction coefficient α is set to 1 when the lateral acceleration G is zero and is decreased as the lateral acceleration G increases. Here, the ground contact load of the outer wheel increases by the amount of decrease of the ground contact load of the inner wheel. When normally traveling on a road, the correction coefficient α rarely falls below 0.5.

Figure 5:
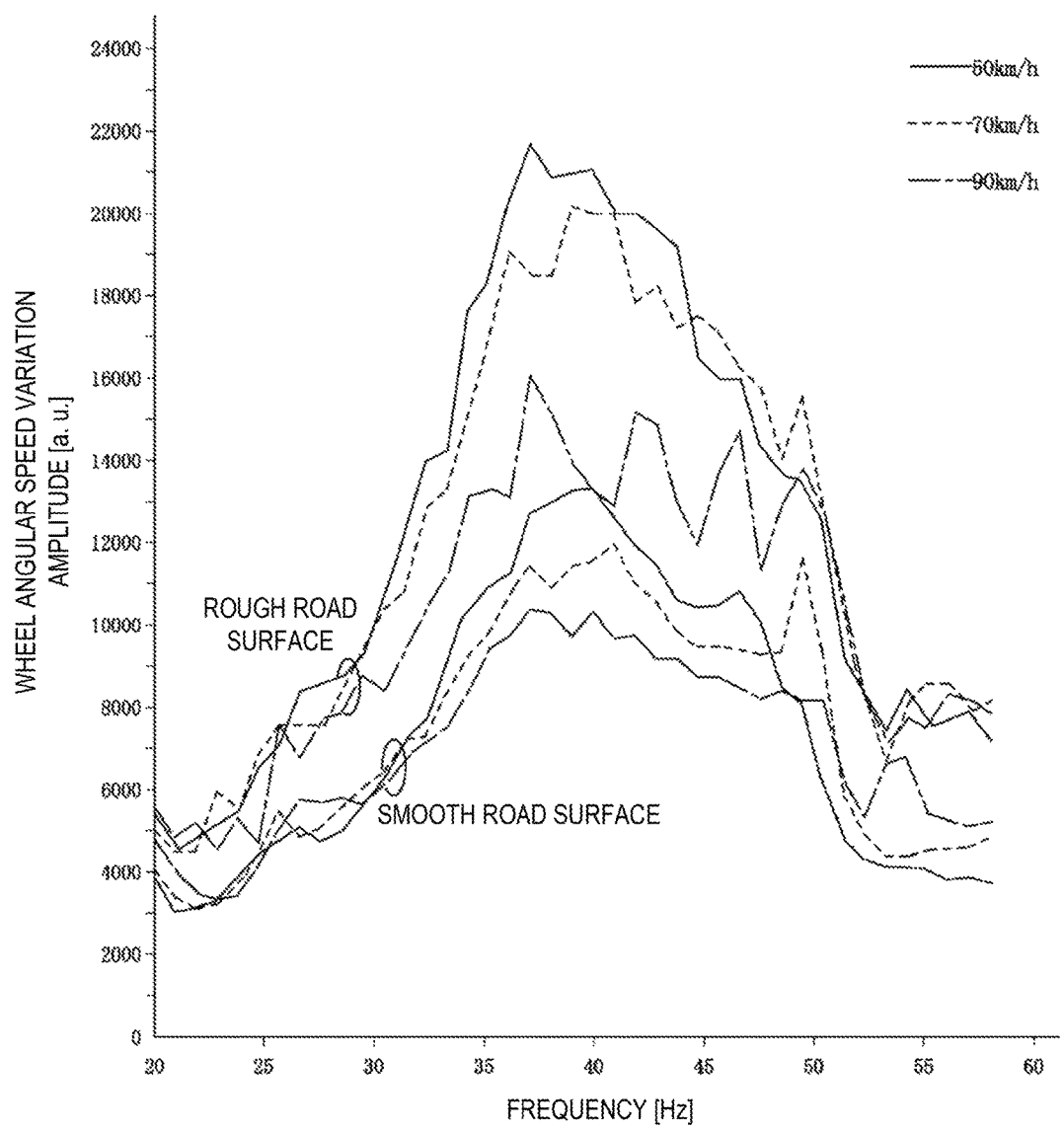
FIG. 5 is a chart illustrating frequency characteristics of angular speed variations of a vehicle wheel on a smooth road surface and a rough road surface.

Next, at S3, the information on the road surface condition detected by the road surface condition detector is acquired. Then at S4, an evaluation for the determination of the road surface roughness is conducted on the information acquired at S3. For example, in a case where the vehicle 1 turns left, the angular speed detected by the wheel speed sensor 14a of the inner wheel of the main drive wheels is acquired and a variation of this angular speed is evaluated by frequency analysis to obtain a frequency character of the angular speed variation as illustrated in FIG. 5.

At S5, whether the road surface is rough is determined by the road surface condition determining module 13b based on the evaluation of S4. For example, as illustrated in FIG. 5, although depending on the vehicle speed, based on that the angular speed variation within a given frequency range (30-50 Hz) becomes about 1.4 to 2 times on a rough road surface than that on a smooth road surface, the road surface is determined as rough when the angular speed variation exceeds a given reference value. The reference value may be set for each vehicle speed. S3-S5 correspond to the road surface condition determination process. Note that in the road surface condition determination process, the road surface roughness may be determined by evaluating cracks, unevenness, etc. of the road surface based on an image captured by the camera, or the road surface roughness may be determined by evaluating the unevenness, etc. acquired by the radar.

If the road surface is determined as rough (YES at S5), the load change rate γ corresponding to the rough road surface of FIG. 3 is selected at S6 and then proceeds to S8. Moreover, if the road surface is determined as not rough (NO at S5), the load change rate γ corresponding to the smooth road surface is selected at S7 and then proceeds to S8. Then at S8, the ground contact load Wr corrected based on the ground contact load Wa of the inner wheel when turning and the selected load change rate γ is calculated. This calculation is conducted based on an arithmetic expression of Wr=Wa×γ. Although the increase of the ground contact load of the outer wheel may be corrected, the calculation may be carried out at least on the inner wheel of which the ground contact load Wr decreases and a slip easily occurs. S6-S8 correspond to the load correction process.

Next at S9, based on the corrected ground contact load Wr and also the road surface µ, the lateral force Gf, the driving force Df acquired at S1, a total force Rf of the lateral force Gf and the driving force Df, and the frictional force Fm between the inner wheel of the main drive wheels and the road surface are calculated. For example, the total force Rf is obtained by calculating a square root of a squared sum of the lateral force Gf and the driving force Df, and a product of the ground contact load Wr and the road surface µ is calculated to obtain the frictional force Fm.

Figure 6:
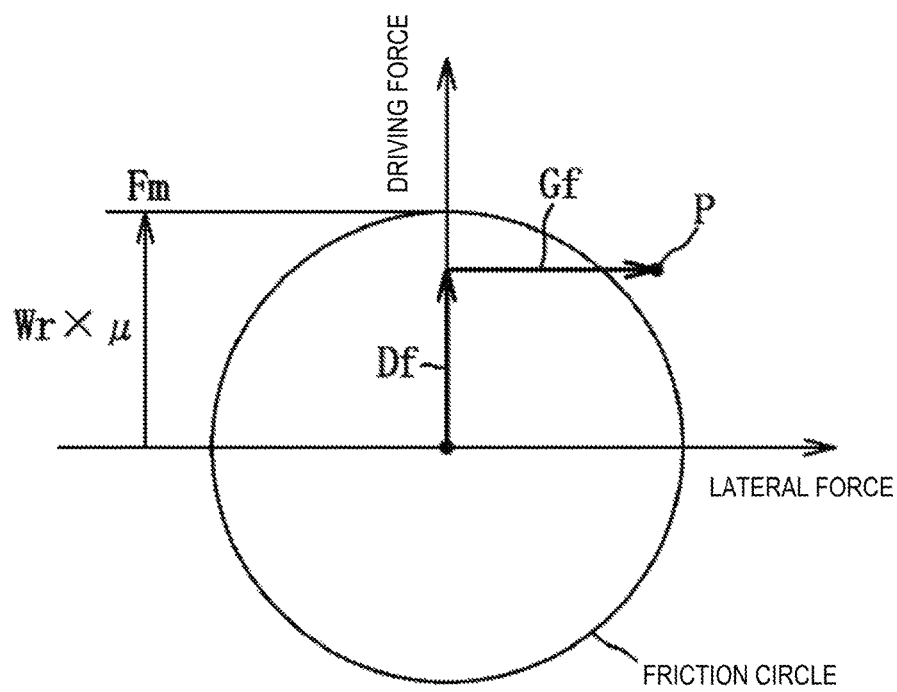
FIG. 6 is a view illustrating a friction circle.

Next at S10, the total force Rf is compared to the frictional force Fm, and at S11, whether the slip is predicted to occur is determined. It is determined that the slip is predicted to occur (YES at S11) if the total force Rf is higher than the frictional force Fm, and it is determined that the slip is not predicted to occur (NO at S11) if the total force Rf is lower than the frictional force Fm. S9-S11 correspond to the prediction process. Note that in the prediction process, as illustrated in FIG. 6, a friction circle having a radius of the frictional force Fm around an origin is set on a plane of which the vertical axis and the horizontal axis are the driving force and the lateral force, respectively, and it may be determined that the slip is predicted to occur when a point P defined by the driving force Df and the lateral force Gf is on the circumference or outside the friction circle, and it may be determined that the slip is not predicted to occur when the point P is inside the friction circle.

If determined that the slip is predicted to occur (YES at S11), the control for reducing the driving force Df so that the total force Rf does not exceed the frictional force Fm is executed to prevent the slip, and then the flow returns. This control for reducing the driving force Df is a control for distributing a part of the driving force for the main drive wheels to the part-time drive wheels. By this distribution of the driving force, the slip is prevented and the vehicle 1 travels while keeping the driving force for driving the vehicle 1. On the other hand, if determined that the slip is not predicted to occur (NO at S11), the current driving force Df is kept and the flow returns. S12-S13 correspond to the driving force control process.

Next, operation and effects of the present disclosure will be described.

In a method of controlling the driving force according to this embodiment of the present disclosure, the correction in which the road surface roughness determined in the road surface condition determination process is reflected on the ground contact load Wa of the inner wheel of the main drive wheels is performed to obtain the ground contact load Wr. Further, in the prediction process, the slip occurrence prediction of the inner wheel of the main drive wheels is performed based on the ground contact load Wr, the road surface µ, the lateral force Gf, and the driving force Df, and if the slip is predicted to occur, the driving force is controlled to prevent the slip in the driving force control process. Thus, the driving force control is executed according to the road surface roughness, which effectively prevents the slip occurrence caused by the rough road surface.

Moreover, since the reduction of the ground contact load due to the road surface roughness is reflected on the inner wheel when turning, the inner wheel which easily slips due to the ground contact load reduction when turning is effectively prevented from slipping.

Additionally, since the part of the driving force for the main drive wheels is distributed to the part-time drive wheels when the slip of the inner wheel of the main drive wheels is predicted to occur, the slip of the main drive wheels is effectively prevented while keeping the driving force of the vehicle 1.

Next, examples in which the above embodiment is partially modified will be described.

(1) Although in the above embodiment the slip is prevented by distributing the part of the driving force of the main drive wheels to the part-time drive wheels, the slip occurrence may also be predicted for the part-time drive wheels in addition to the main drive wheels, and if determined that the slip is predicted to occur for the main drive wheels and the part-time drive wheels, the slip may be prevented by adjusting the output of the engine 6 in addition to or instead of distributing the driving force.

(2) In the load correction process, the ground contact load W when the vehicle is stopped may be corrected to the ground contact load Wr based on the correction coefficient α corresponding to the lateral acceleration G and the load change rate γ corresponding to the road surface roughness.

(3) The driving force control is applicable to a 4WD vehicle based on rear-wheel drive in which the rear wheels 3a and 3b are the main drive wheels.

Additionally, those skilled in the art can implement the above embodiment and modifications with an addition of various changes without departing from the scope of the present disclosure, and the present disclosure also includes such modifications.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle (Four-wheel Drive (4WD) Vehicle)
2a, 2b Front wheel (Main Drive Wheel)
3a, 3b Rear wheel (Part-time Drive Wheel)
6 Engine
10 Driving Force Transmission Shaft
13 Control Unit
13a Traction Controlling Module
13b Road Surface Condition Determining Module
14a, 14b, 15a, 15b Wheel Speed Sensor
16 Lateral Acceleration Sensor

What is claimed is:

1. A method of controlling a driving force of a four-wheel drive vehicle, comprising causing a control unit including a processor to:
    acquire, as information on a road surface condition, a vehicle speed, a lateral acceleration, a driving force of a wheel, a road surface friction coefficient, and a ground contact load of the wheel when the vehicle is traveling, the ground contact load calculated based on a ground contact load of the wheel when the vehicle is stopped and the lateral acceleration;
    determine whether a road surface is rough based on the acquired road surface condition;
    correct, when the road surface is determined to be rough, the ground contact load of the wheel when the vehicle is traveling, by applying thereto a load change rate set according to the roughness of the road surface;
    predict an occurrence of a slip of the wheel by comparing a product of the corrected ground contact load and the road surface friction coefficient to a total force of the driving force of the wheel and a lateral force caused by a lateral acceleration in cornering; and
    reduce, when the slip is predicted to occur, the driving force of the wheel so as to prevent the slip occurrence.

2. The method of claim 1, wherein when a slip of main drive wheels to which a driving force of an engine is transmitted without using a coupling is predicted to occur in the slip occurrence prediction, in the driving force reduction, driving forces of the main drive wheels are reduced by engaging the coupling to distribute the driving force of the engine to part-time drive wheels to which the driving force of the engine is transmitted through the coupling.

3. The method of claim 2, wherein a ground contact load of an inner wheel of the main drive wheels when the vehicle turns is corrected in the ground contact load correction, and
    wherein when a slip of the inner wheel is predicted to occur in the slip occurrence prediction, in the driving force reduction, a driving force of the inner wheel is reduced by distributing the driving force of the engine to the part-time drive wheels through engaging the coupling.

4. A driving force control device for a four-wheel drive vehicle, comprising:
    a wheel speed sensor configured to acquire a speed of a wheel;
    a lateral acceleration sensor configured to acquire a lateral acceleration of the vehicle;
    a road surface condition detector configured to acquire information on a road surface condition; and
    a control unit including a processor configured to acquire a driving force of an engine after passing through a transmission, a road surface friction coefficient calculated based on the speed of the wheel and the driving force, and a ground contact load of the wheel when the vehicle is traveling, the ground contact load calculated based on a ground contact load of the wheel when the vehicle is stopped and the lateral acceleration,
    wherein the control unit corrects the ground contact load of the wheel when the vehicle is traveling by applying thereto a load change rate set according to a roughness of a road surface estimated based on the information on the road surface condition, and
    wherein when a friction circle defined by a product of the corrected ground contact load and the road surface friction coefficient is compared to a total force of the driving force of the wheel and a lateral force caused by a lateral acceleration in cornering to find that the total force is close to the friction circle, the driving force of the wheel is reduced to prevent a slip from occurring.

5. The device of claim 4, wherein when the total force is close to the friction circle for main drive wheels to which the driving force of the engine is transmitted without using a coupling, the control unit distributes the driving force to part-time drive wheels by engaging the coupling.

6. The device of claim 5, wherein when the total force is close to the friction circle for an inner wheel of the main drive wheels in cornering, the control unit distributes the driving force to the part-time drive wheels by engaging the coupling.

* * * * *